United States Patent
Lerner et al.

(10) Patent No.: US 11,733,122 B1
(45) Date of Patent: Aug. 22, 2023

(54) TOILET MONITORING NETWORK THAT DETECTS LEAKS AND FLUSHES

(71) Applicant: ANACOVE, LLC, La Jolla, CA (US)

(72) Inventors: Ian Amihay Lerner, La Jolla, CA (US); Alistair Ian Chatwin, Highlands Ranch, CO (US); Roswell Reid Roberts, III, San Diego, CA (US); Carlos Shteremberg, La Jolla, CA (US)

(73) Assignee: ANACOVE, LLC, La Jolla, CA (US)

( * ) Notice: Subject to any disclaimer, the term of this patent is extended or adjusted under 35 U.S.C. 154(b) by 0 days.

(21) Appl. No.: 18/188,418

(22) Filed: Mar. 22, 2023

(51) Int. Cl.
| | |
|---|---|
| G01M 3/26 | (2006.01) |
| E03D 9/00 | (2006.01) |
| G01L 19/00 | (2006.01) |
| G01L 19/12 | (2006.01) |
| G01L 19/14 | (2006.01) |
| G01L 19/08 | (2006.01) |

(52) U.S. Cl.
CPC .......... *G01M 3/26* (2013.01); *E03D 9/00* (2013.01); *G01L 19/0092* (2013.01); *G01L 19/086* (2013.01); *G01L 19/12* (2013.01); *G01L 19/149* (2013.01)

(58) Field of Classification Search
None
See application file for complete search history.

(56) References Cited

U.S. PATENT DOCUMENTS

| | | | | |
|---|---|---|---|---|
| 10,234,048 | B2* | 3/2019 | Korten | F16K 31/126 |
| 11,378,235 | B2* | 7/2022 | Dietzen | F17D 5/06 |
| 11,629,721 | B2* | 4/2023 | Greenboim | G01M 3/26 |
| | | | | 73/152.05 |
| 2016/0313168 | A1* | 10/2016 | Ogilvie | E03B 7/071 |
| 2018/0066975 | A1* | 3/2018 | Viswanathan | G01F 25/20 |

* cited by examiner

*Primary Examiner* — Octavia Davis Hollington
*Assistant Examiner* — Jermaine L Jenkins
(74) *Attorney, Agent, or Firm* — Arc IP Law, PC; Joseph J. Mayo

(57) ABSTRACT

A system that monitors toilets for leaks using in-toilet monitors with pressure sensors that are placed underwater in toilet tanks. Monitors can be dropped into tanks without additional wiring or installation; they may be battery powered and may transmit data wirelessly. Data may be analyzed by a server that detects leaks or other malfunctions. Pressure data may be filtered to remove the effect of barometric pressure, to measure the height of water in the tank. The system may learn the flush pressure change pattern for each toilet; pressure changes that do not match this pattern may indicate problems such as leaks. Data may indicate the type of leak, such as an open flapper or a leaking valve. Toilet monitors may measure temperature, and the system may generate alerts when freezing appears imminent. The system may keep flush counts for each toilet to support maintenance and water consumption measurement.

15 Claims, 12 Drawing Sheets

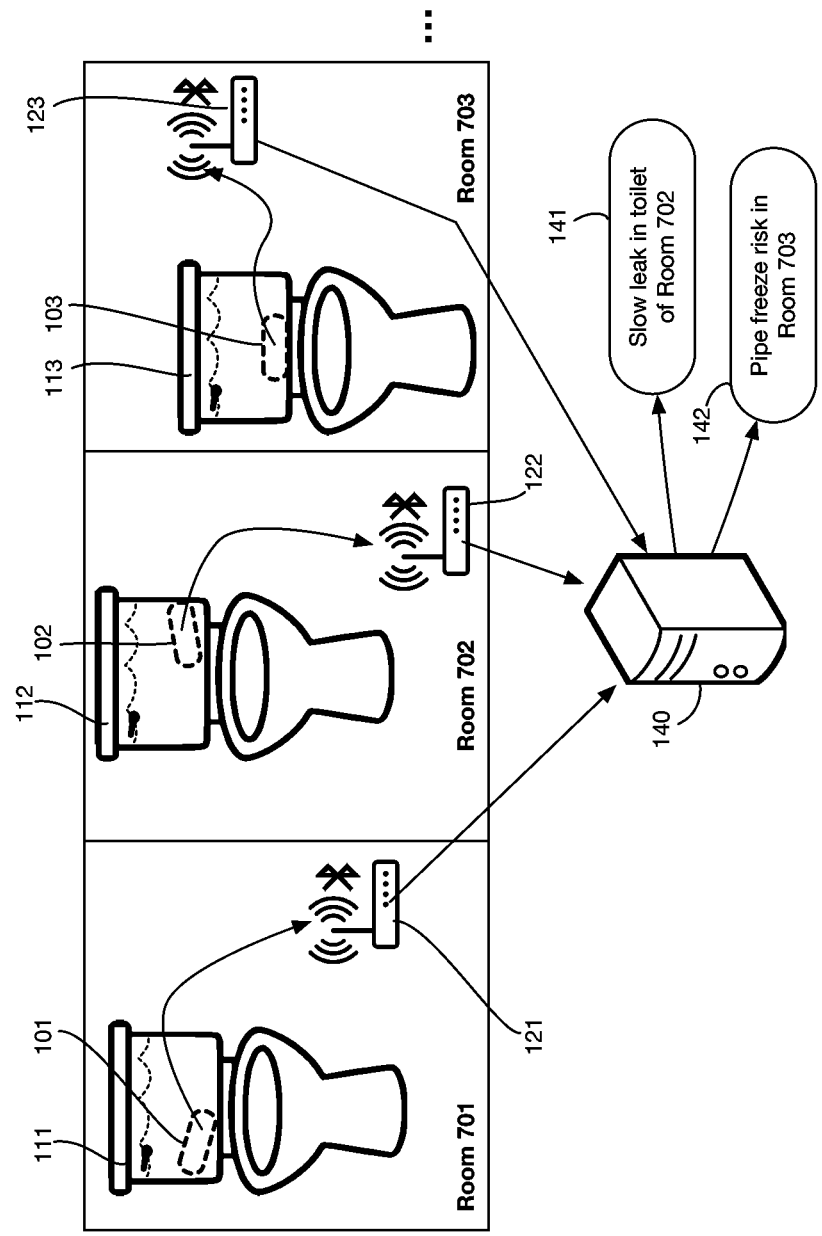

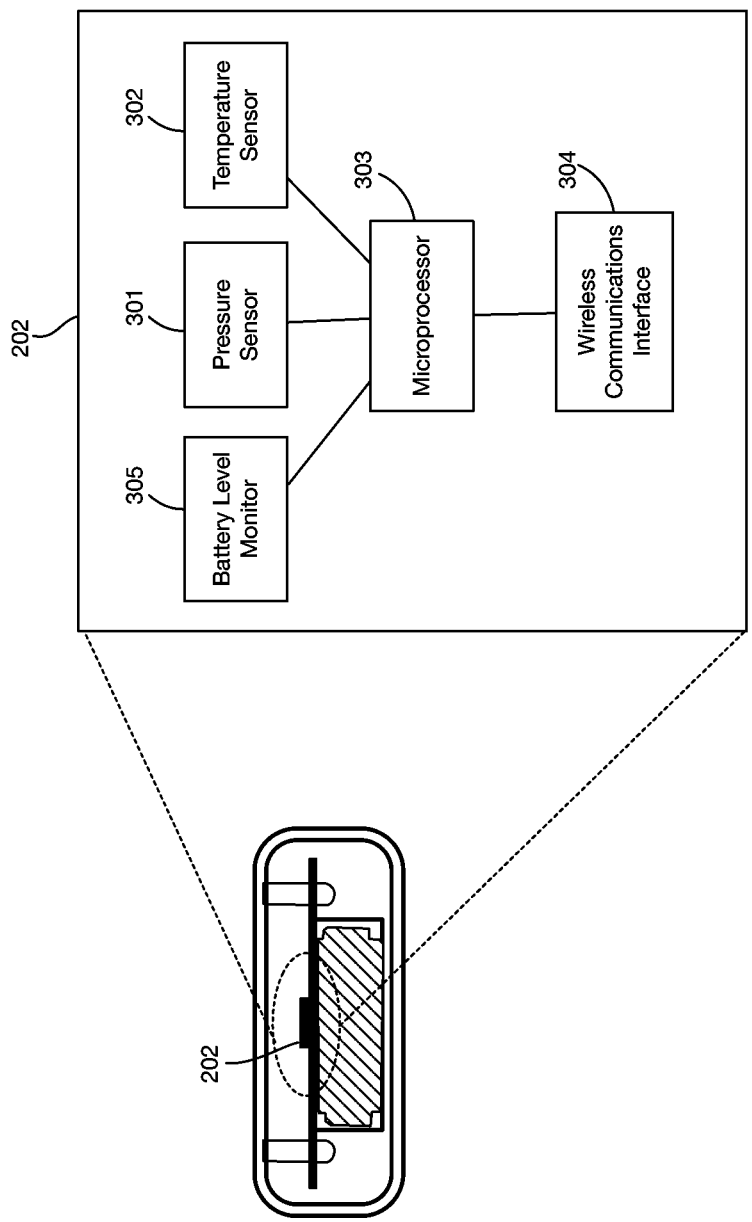

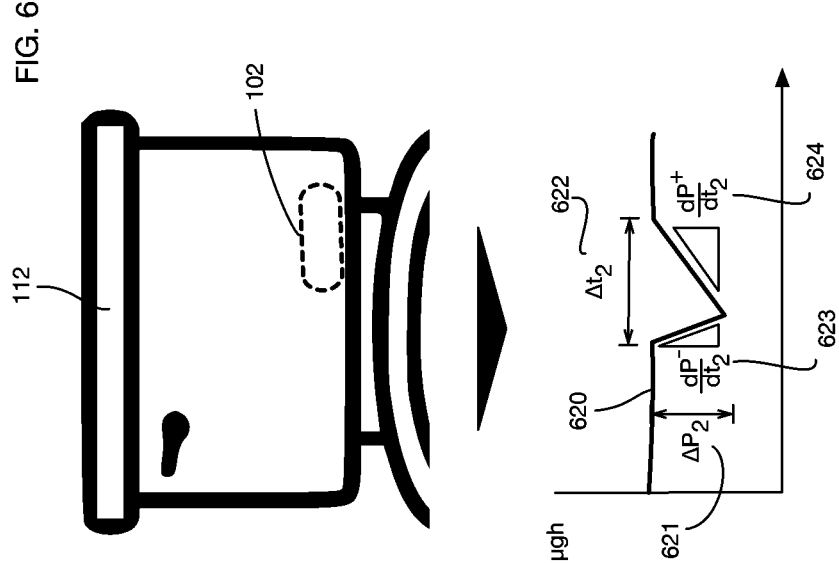
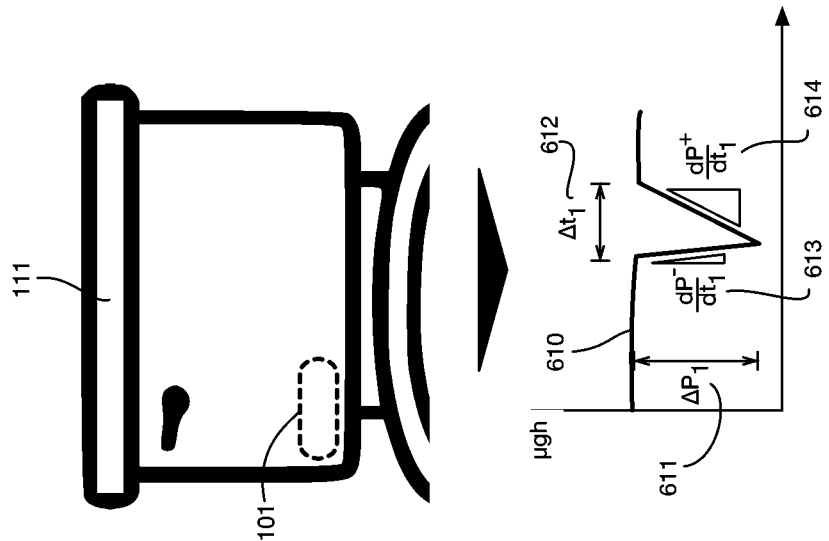
FIG. 6

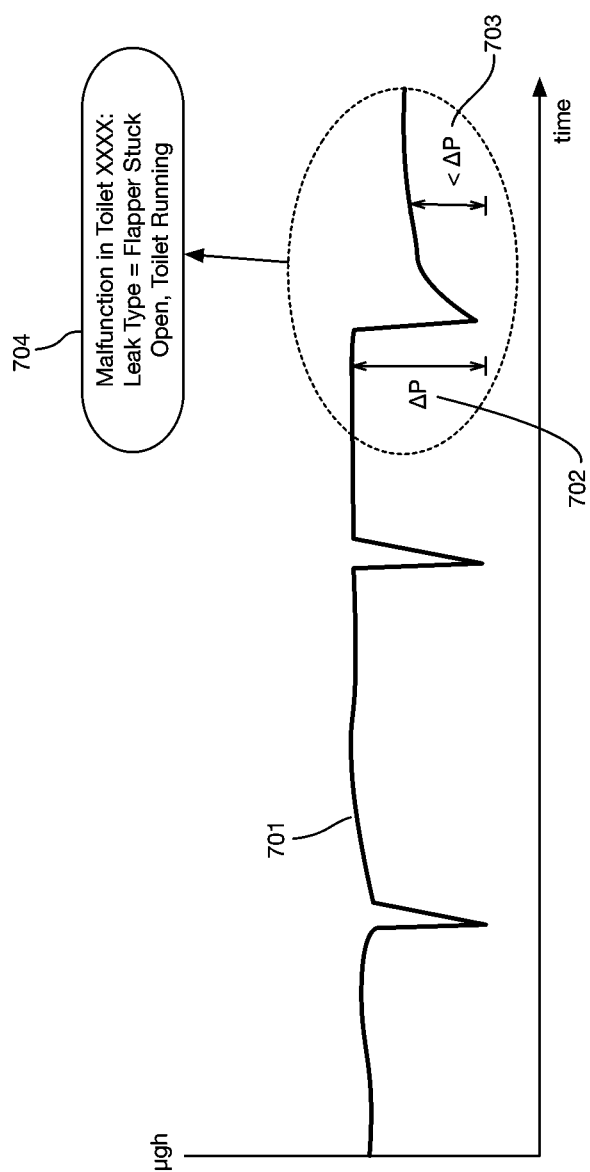

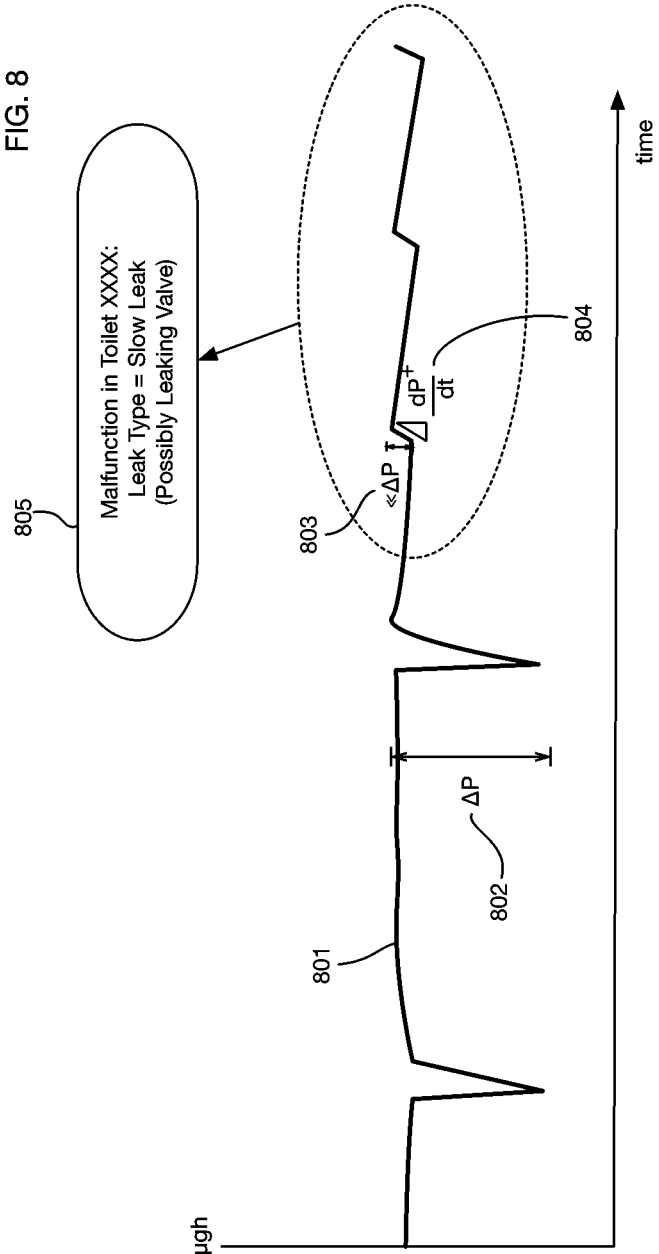

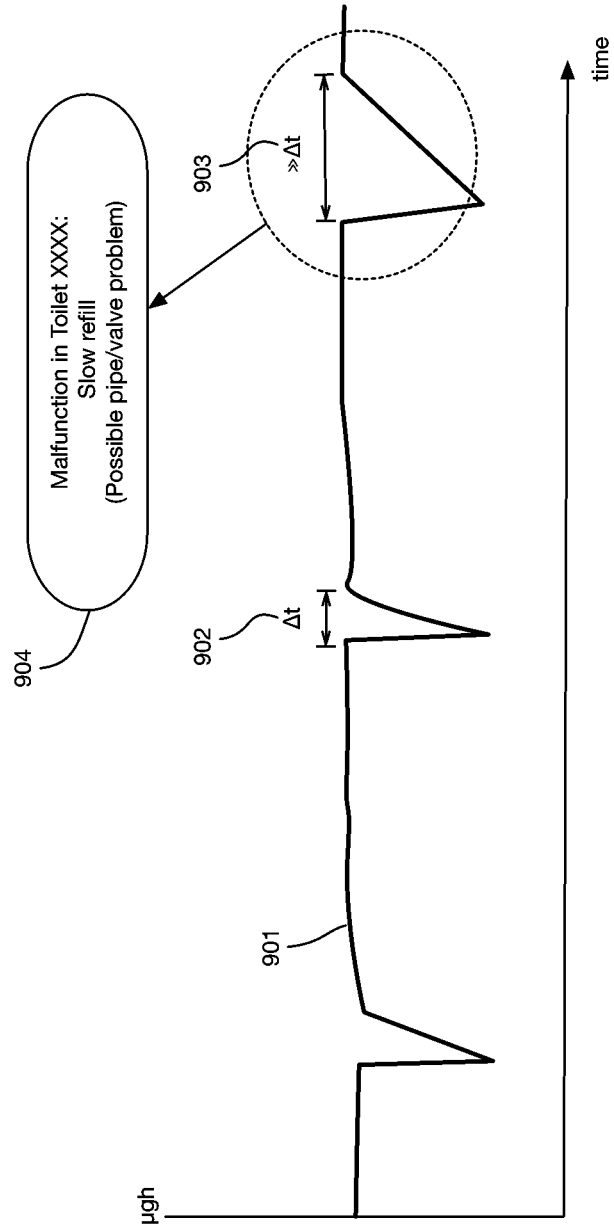

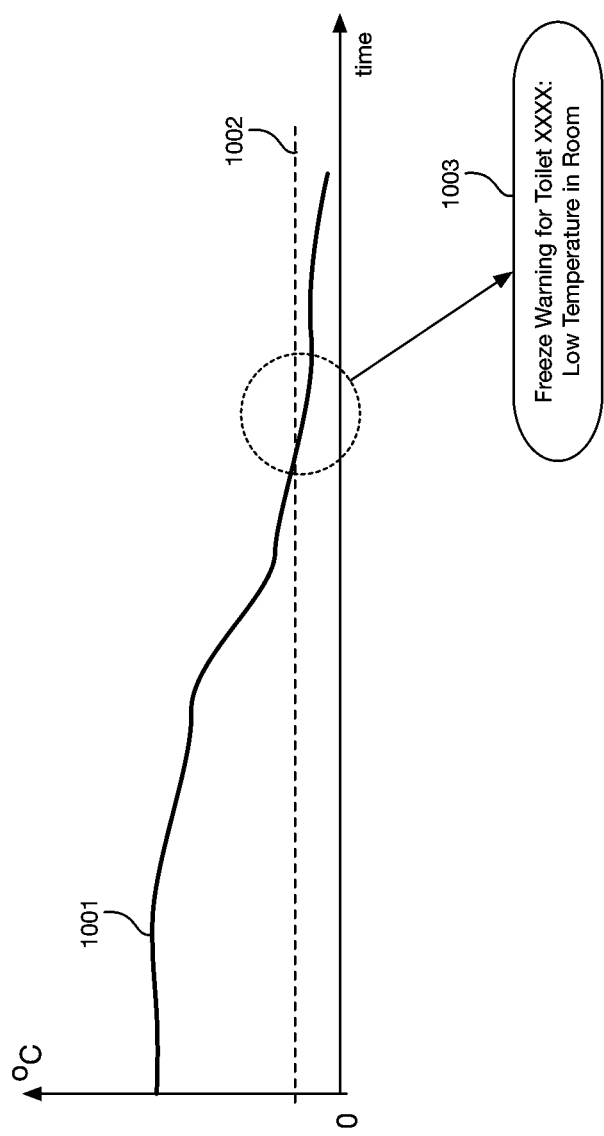

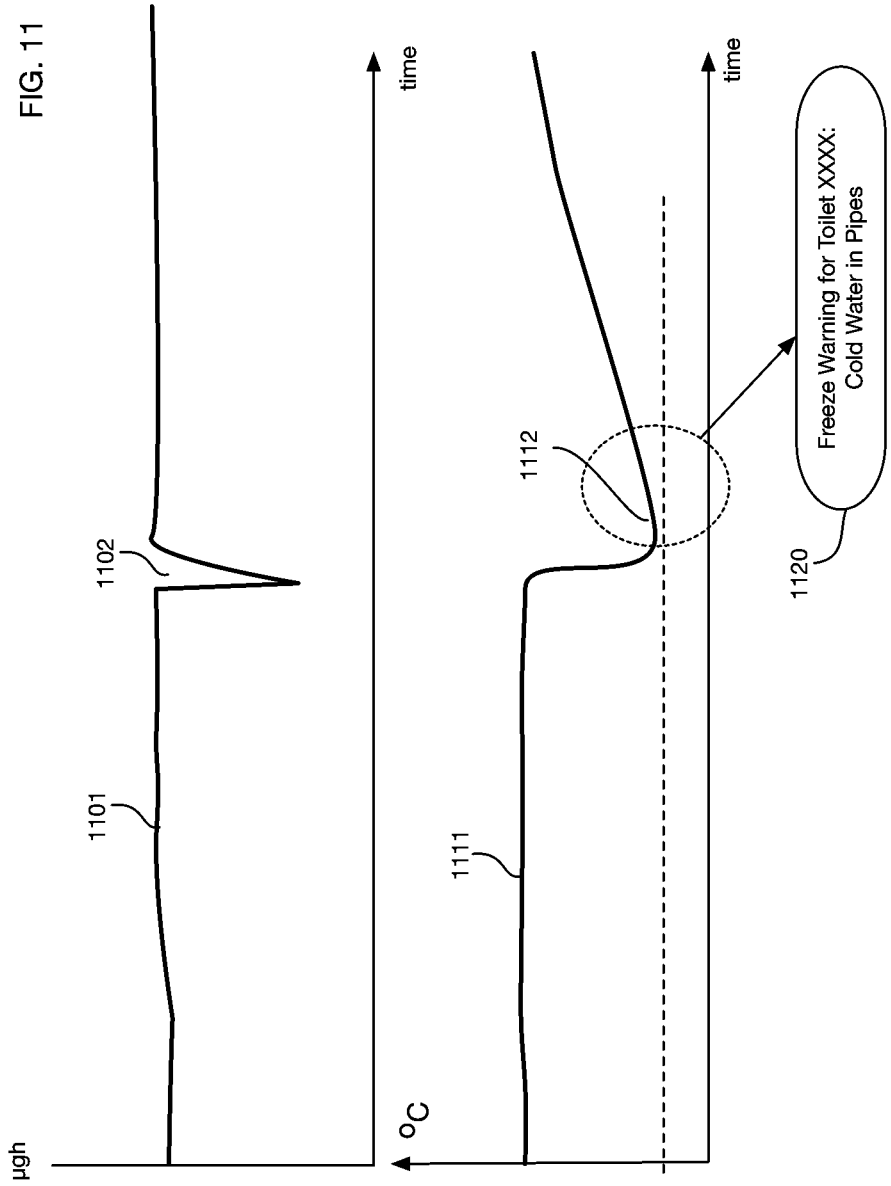

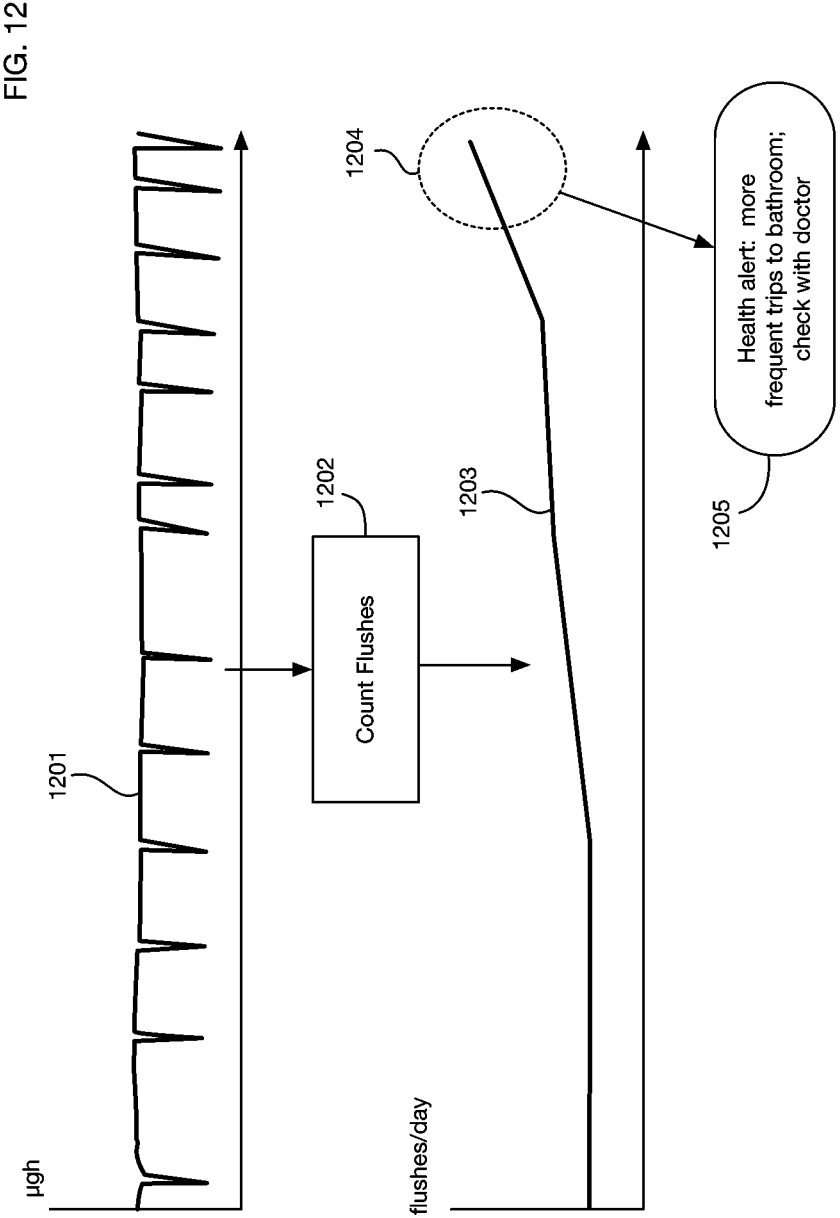

TOILET MONITORING NETWORK THAT DETECTS LEAKS AND FLUSHES

BACKGROUND OF THE INVENTION

Field of the Invention

One or more embodiments of the invention are related to the field of plumbing appliances and electronic monitoring devices. More particularly, but not by way of limitation, one or more embodiments of the invention enable a toilet monitoring network that detects leaks and flushes.

Description of the Related Art

Water leaks represent a large cost for lodging and institutions. Leaking toilets are a leading cause of this waste. In a typical building almost 20% of toilets leak, which can translate to $70 per month per toilet. Management is often unaware of which toilets are leaking or what specific types of problems are causing leaking toilets.

Existing solutions for toilet leak detection are generally costly and complex to install and configure. They typically require wiring for power and communication. Some existing solutions must be integrated into the plumbing of a building, which is prohibitively complex after a building is constructed. As a result, few organizations deploy these solutions throughout their facilities. There are no known toilet monitoring systems that are inexpensive and that are extremely simple to install in any toilet in a facility.

For at least the limitations described above there is a need for a toilet monitoring network that detects leaks and flushes.

BRIEF SUMMARY OF THE INVENTION

One or more embodiments described in the specification are related to a toilet monitoring network that detects leaks and flushes. One or more embodiments of the invention may monitor multiple toilets using devices that are placed into the toilet tanks, with some or all of the data analysis performed by processors connected to the toilet monitors via wireless network connections.

One or more embodiments of the invention may include multiple toilet monitors, each of which is configured to be placed under water in the tank of a corresponding toilet. Each toilet monitor may have a flexible watertight housing configured to flex to equalize the internal pressure within the housing with the pressure of the water in the tank. Electronics contained within the housing may include a pressure sensor configured to measure the internal pressure, a wireless communications interface, and a microprocessor coupled to the pressure sensor and to the wireless communications interface. The microprocessor may obtain a series of pressure data from the pressure sensor and transmit the series of pressure data via the wireless communications interface. The toilet monitoring system may also include an analysis system with one or more processors coupled to the toilet monitors via a network connection. The analysis system may receive the series of pressure data from each toilet monitor, transform it to a filtered series that substantially removes changes in barometric pressure from the data, and analyze the filtered series. Analysis of the filtered series may identify the flush pressure change pattern of the corresponding toilet in which the toilet monitor is installed. When the filtered series indicates a substantial pressure change that does not match the flush pressure change pattern, the system may transmit a malfunction alert with an identification of the corresponding toilet.

In one or more embodiments, the malfunction alert may include a type of the malfunction. This malfunction type may for example may be a slow leak malfunction, or an open flapper malfunction.

In one or more embodiments the analysis system may also increment a flush count of a toilet when its filtered pressure data series indicates a pressure change that matches the flush pressure change for the toilet. The flush count may be transmitted along with the identification of the toilet.

In one or more embodiments, a high pass filter may be applied to the series of pressure data to obtain the filtered series.

In one or more embodiments, the flush pressure change pattern may include a flush pressure drop that is the change in pressure of the filtered series from a filled tank pressure level prior to a flush to the minimum pressure value during the flush. The pattern may also include a flush cycle time that is the time difference between the start of a flush and the time when the tank completes refilling after the flush. It may also include a tank refill rate that is the rate of pressure change when the tank is refilling after the flush.

In one or more embodiments, the type of malfunction may include a slow leak malfunction. The analysis system may identify a slow leak malfunction when pressure in the filtered series increases repeatedly at a rate that is substantially equal to the tank refill rate without a preceding pressure reduction substantially equal to the flush pressure drop.

In one or more embodiments, the type of malfunction may include an open flapper malfunction. The analysis system may identify an open flapper malfunction when pressure in the filtered series decreases by a change amount substantially equal to the flush pressure drop, and pressure does not subsequently increase by this change amount.

In one or more embodiments, the toilet monitor may also include a temperature sensor. The microprocessor may obtain a series of temperature data from the temperature sensor and transmit the series via the wireless communications interface. The analysis system may receive the temperature series from each toilet monitor and analyze it so that when it contains a temperature below a threshold value, it transmits a water freeze warning alert along with the identification of the corresponding toilet. In one or more embodiments the analysis system may also modify the series of pressure data based on the series of temperature data to remove the effect of temperature on the changes in barometric pressure.

In one or more embodiments, the wireless communications interface of the toilet monitor may include a Bluetooth Low Energy communications interface. The microprocessor may transmit the series of pressure data via the Bluetooth Low Energy interface to a gateway near the toilet monitor, and the gateway may forward the series of pressure data to the analysis system.

In one or more embodiments, each toilet monitor may be configured to be placed under water in the tank of the corresponding toilet in any position and in any orientation without affecting the functionality of electronics.

In one or more embodiments, each toilet monitor may have a battery level monitor. One or both of the microprocessor and the analysis system may transmit an alert when the battery level measured by the battery level monitor falls below a battery level threshold value.

In one or more embodiments, each toilet monitor may be disc shaped. The diameter of the disc may be approximately 46 mm in one or more embodiments, and the height of the disc may be approximately 20 mm in one or more embodiments. In addition, in one or more embodiments, each toilet monitor may be made from thermoplastic polyurethanes (TPE-U or TPU) or any other type of plastic, rubber or elastomer that can maintain hermetic and wireless properties of the device. Furthermore, for the purposes of this disclosure, one or more embodiments utilize hermetic cases or outer shells, wherein hermetic means airtight and watertight herein.

BRIEF DESCRIPTION OF THE DRAWINGS

The above and other aspects, features and advantages of the invention will be more apparent from the following more particular description thereof, presented in conjunction with the following drawings wherein:

FIG. 1 shows an illustrative network with three in-toilet monitors that send data to a central server for analysis and detection of problems.

FIG. 3 shows an architectural block diagram of the electronic components of the toilet monitor of FIG. 2D.

FIG. 6 illustrates how an embodiment of the invention may learn the specific flush pressure change parameters of the toilet in which it is installed.

FIG. 7 illustrates how an embodiment of the invention may detect an open flapper, running toilet leak from pressure data.

FIG. 8 illustrates how an embodiment of the invention may detect a slow leak from pressure data.

FIG. 9 illustrates how an embodiment of the invention may detect a refill problem from pressure data.

FIG. 10 illustrates how an embodiment of the invention may detect a potential water freeze situation from temperature data.

FIG. 11 illustrates how an embodiment of the invention may detect a potential freeze in water pipes from temperature data combined with pressure data.

FIG. 12 illustrates how an embodiment of the invention may provide a health warning based on flush count data.

DETAILED DESCRIPTION OF THE INVENTION

Figure 2A:
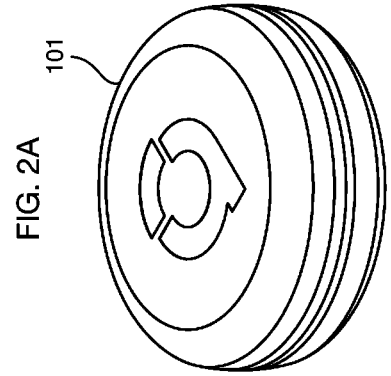
FIG. 2A shows a perspective view of an embodiment of a toilet monitor.

A toilet monitoring network that detects leaks and flushes will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 shows an illustrative embodiment of the invention that monitors three toilets 111, 112, and 113 for leaks. Embodiments of the invention may monitor any number of toilets in any type or types of building or facility. A toilet monitor may be placed in the tank of each toilet; in the embodiment of FIG. 1, toilet monitors 101, 102, and 103 are placed in the tanks of toilets 111, 112, and 113 respectively. (Toilet monitors are not shown to scale; they may be of any size and shape.) Each toilet monitor is placed underwater in the corresponding tank (when the tank is full). Toilet monitors may be placed in any location and in any orientation in the tank without comprising the functionality of their electronics. Installation consists of simply dropping the toilet monitor into the tank; no other steps or configuration is necessary. Each monitor measures pressure and possibly other parameters of the water in the toilet tank over time and transmits this data series a wireless connection to one or more processors for analysis. In one or more embodiments, some or all of the data analysis may be performed by processors installed in or coupled to the toilet monitors. In the embodiment shown in FIG. 1, the toilet monitors transmit data wirelessly via Bluetooth Low Energy to a gateway in each room, which then forwards the data to a server 140 for further analysis. The illustrative gateways 121, 122, and 123 are Bluetooth Low Energy gateways. A benefit of using Bluetooth Low Energy or a similar short-range network is that the power requirement for the toilet monitors may be reduced, enabling for example the use of smaller batteries, and extending the lifetime of the device between battery changes or recharges. However, in one or more embodiments any wireless network of any range may be used. In one or more embodiments the toilet monitors may transmit data directly to analysis server 140 rather than sending data to a gateway to be forwarded to the server.

Server 140 may be any processor or collection of processors, in any location or locations. For example, an analysis server may be a cloud resource that analyzes data and forwards results to any client or clients that want to monitor the toilets. In one or more embodiments server 140 may be a local resource, such as a smartphone in a user's house. Data analysis may be performed by a collection of processors, which may include processors in the toilet monitors, the gateways, and the server or servers. The data analysis by server 140 (or other processors) may result in alert messages or other messages; for example, server 140 may transmit an alert 141 of a leak in a toilet, and an alert 142 warning of a potential pipe freeze. Alerts may identify the specific toilet associated with each warning.

Figure 2B:
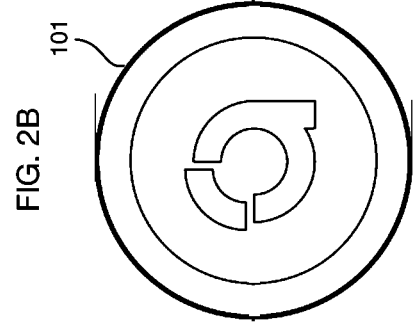
FIG. 2B shows a top view and FIG. 2C shows a side view.
Figure 2C:
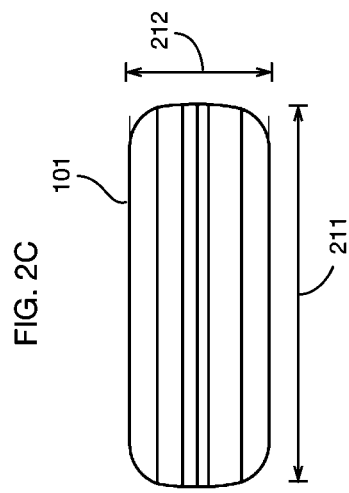
Figure 2D:
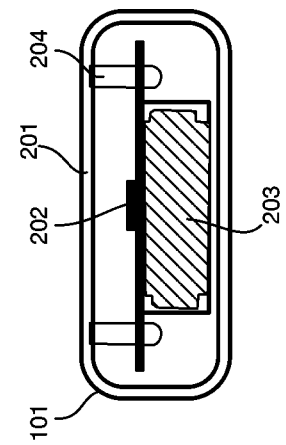
FIG. 2D shows a cross-section view of the toilet monitor that shows the internal components surrounded by a flexible, watertight housing.

FIGS. 2A through 2D show different views of an illustrative embodiment of a toilet monitor 101 (which is placed within a toilet bowl). FIG. 2A shows a perspective view. FIG. 2B shows a top view. FIG. 2C shows a side view. FIG. 2D shows a cross-section side view that illustrates internal components. Toilet monitors may be of any shape and size; the illustrative monitor 101 is disc-shaped and may for example resemble a cleaning or disinfecting tablet that is dropped into a toilet bowl. An illustrative diameter 211 may be for example approximately 46 mm, and an illustrative height 212 may be for example approximately 20 mm. (The shape and color may be selected to deliberately disguise the monitor as a tablet to discourage theft, for example.) Monitor 101 may have a flexible, watertight housing 201 that surrounds a chamber containing internal electronics. At least a portion of the housing may flex in order to transmit pressure changes from the water in the tank to the air contained in the chamber. Internal electronic components may include for example integrated circuits 202 and a battery 203. A circuit board may be held in position via posts or other features 204 that keep the electronics in a fixed position relative to the housing.

FIG. 3 shows a block diagram of illustrative components that may be included in the electronics 202 of a toilet monitor. These components may include a microprocessor 303, a pressure sensor 301 and a temperature sensor 302, and a wireless communications interface 304. The components may be powered by a battery or other power source. For embodiments that are battery powered, electronics 202 may include a battery level monitor 305; the microprocessor 303 may transmit an alert when the battery level drops below a battery level threshold value, indicating that the toilet monitor should be serviced or replaced, or the microprocessor may transmit battery level data to the analysis server and the analysis server may generate an alert when the battery level falls below a battery level threshold value. The pressure sensor 301 and temperature sensor 302 may measure the pressure and temperature, respectively, of the air within the chamber, which will equalize with the pressure and temperature of the water in the toilet tank in which the toilet monitor is installed. The microprocessor may manage data collection from the sensors and transmission of the data series to an analysis server; it may also perform some or all of the data analysis itself. Data may be collected at any desired sample rate. The data series representing sensor samples may be transmitted one sample at a time, or batched so that readings for multiple points in time are transmitted periodically for analysis.

Figure 4:
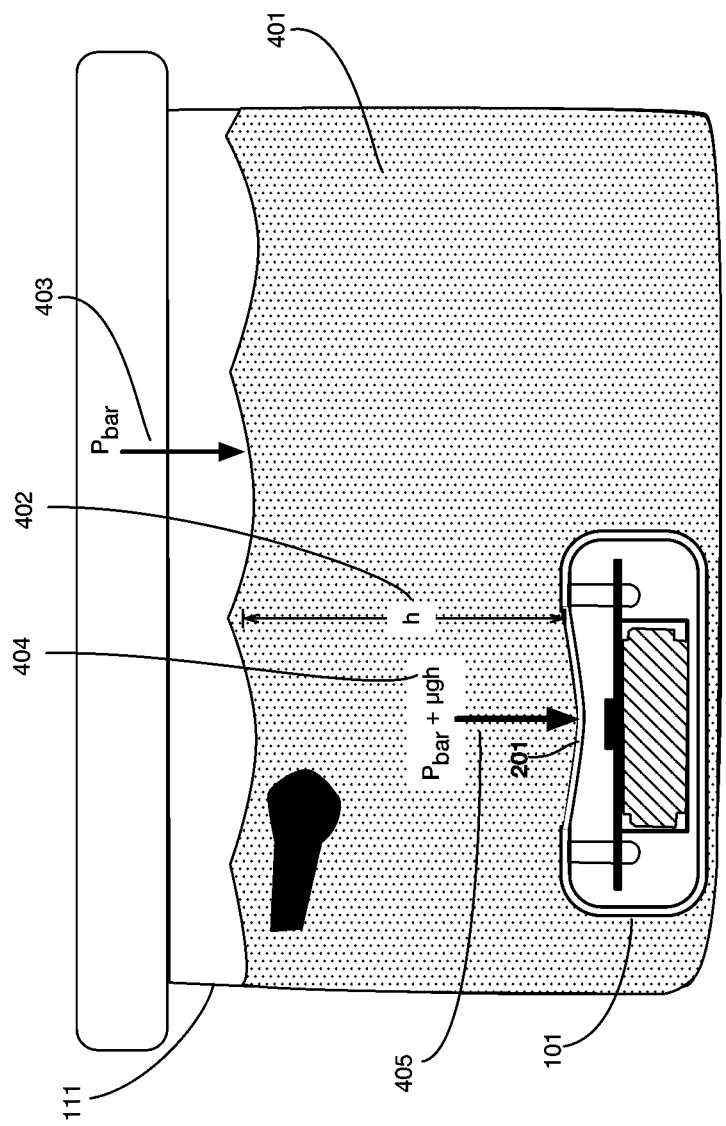
FIG. 4 illustrates how an embodiment of the toilet monitor detects the water level in the toilet tank by measuring pressure.

FIG. 4 illustrates the principle of pressure transmission that enables the toilet monitor to detect changes in the water level of the toilet tank. Monitor 101 is placed under the water 401 in the tank of toilet 111. The flexible housing 201 of the monitor flexes at one or more locations to equilibrate the internal pressure of the air within the chamber and the external pressure of the water surrounding the monitor. The pressure 405 exerted by the water on the housing 201 is the sum of two terms: a water weight factor 404 (μgh, where μ is the density of water) that is proportional to the height 402 of water above the monitor in the tank, and a barometric pressure factor 403 that represents the ambient pressure of air pressing down on the water in the toilet tank.

Figure 5:
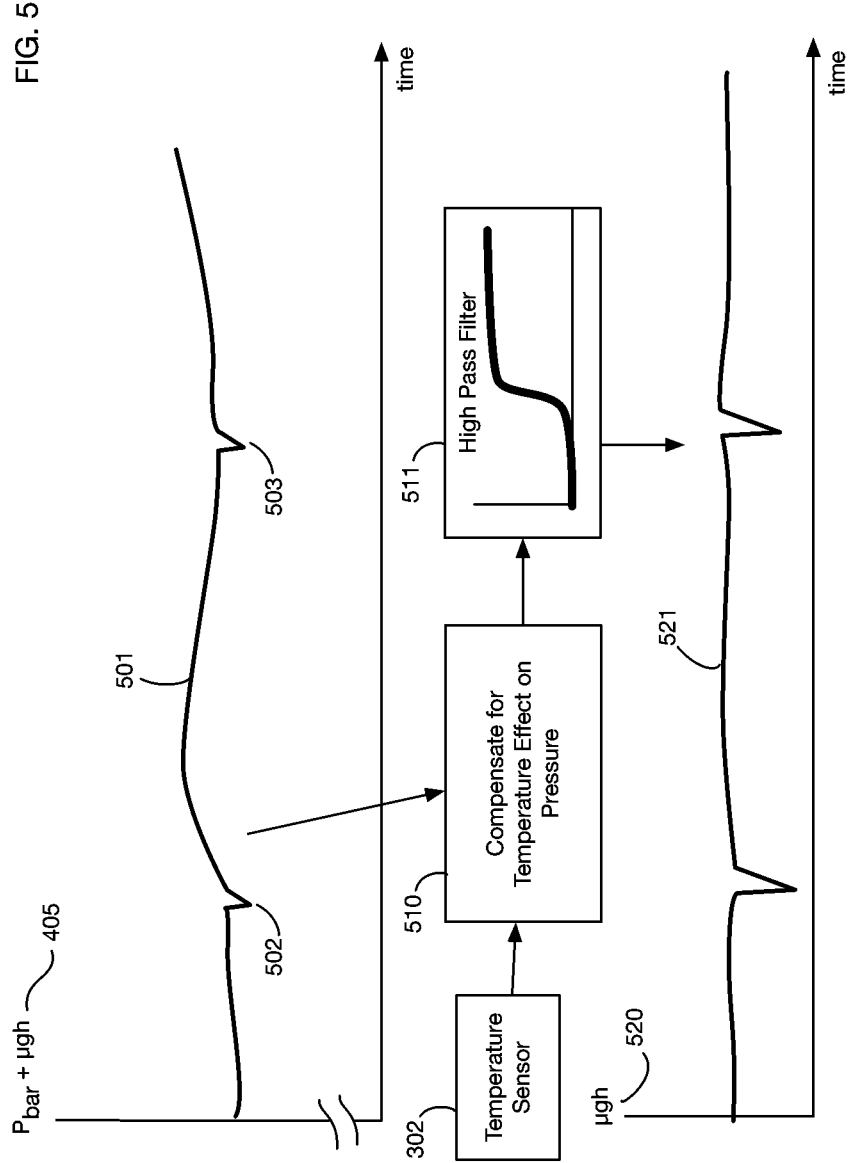
FIG. 5 illustrates processing of the pressure data in the toilet monitor to remove the effect of barometric pressure in order to measure the water level height.

Events of interest in toilet 111 can be detected from changes in the water height 402 in the tank above the toilet monitor 101. For example, a flush causes in a rapid decline of the water height as water flows from the tank into the bowl, followed by a steady increase of the water height back to its previous level as the tank is refilled. Various types of leaks or other malfunctions can be detected by anomalous patterns of water height changes, as described below. However, monitor 101 does not directly measure the water height 402; instead, it measures the combined pressure due to both water height and barometric pressure. Barometric pressure changes over time with weather and temperature. FIG. 5 shows a data series 501 of total pressure 405 obtained from a toilet monitor. This data series shows two small dips in pressure 502 and 503 that occur when the toilet is flushed. However, the total pressure also shows a substantial change over time due to atmospheric pressure changes, which are unrelated to the water level in the tank.

To detect water height changes, the pressure data series 501 received from the pressure sensor in monitor 101 may be processed to remove the effect of these barometric pressure changes. FIG. 5 shows illustrative steps 510 and 511 that may be used in one or more embodiments to transform a data series 501 of total pressure 405 to a filtered series 521 that more directly represents the pressure 520 from the water alone, which is proportional to the water level. Step 510 may transform the pressure data 501 to compensate for the effects of temperature changes, which may be measured for example by temperature sensor 302 in the toilet monitor. Subsequently step 511 may apply a high-pass filter to the transformed pressure data series, to remove or reduce the effects of the slowly change barometric pressure from the data. Step 511 is effective because barometric pressure changes very slowly over the course of one or more days, while the pressure changes due to flushes or leaks occur on much shorter time scales, such as seconds or minutes. The transformed series 521 filters out these low frequency barometric pressure changes; changes to the filtered pressure data therefore correlate closely with changes in water level. The flushes 502 and 503 can be more easily detected in the filtered data series 521, for example.

Once barometric pressure effects are removed from the pressure data series, the filtered pressure data should remain relatively constant for a well-functioning toilet except when the toilet is flushed. Each flush causes a characteristic pattern of a rapid pressure drop followed by a steady increase in pressure back to the previous level of the filled tank. The specific pattern of pressure decrease and increase is a characteristic of each toilet. This pattern depends for example on factors such as the size of the tank, the normal water level in the filled tank, the adjustment of the tank float, the diameter of the exit hole in the bottom of the tank, and the refill valve mechanism. While the flush pressure change pattern varies across toilets, it should be relatively constant for a given toilet from flush to flush. In one or more embodiments of the invention, the toilet monitor may learn the flush pressure change pattern of the toilet in which it is installed, for example by measuring parameters of the filtered pressure curve during one or more initial flushes when the monitor is first placed into a toilet tank. This process is illustrated in FIG. 6 for two toilet monitors: monitor 101 is placed in the tank of toilet 111 and monitor 102 is placed in the tank of toilet 112. Water pressure data series 610 is measured by monitor 101 during a flush of toilet 111 (with compensation for barometric pressure and temperature performed as shown in FIG. 5), and water pressure data series 620 is measured by monitor 102 during a flush of toilet 112 (again with compensation for barometric pressure and temperature). The data series 610 and 620 may represent averages or ranges across several flushes while each respective monitor is learning to identify the flush pressure change pattern of its associated toilet.

Illustrative flush parameters that may be identified by the toilet monitor include the amount of pressure drop during a flush from the filled tank pressure level before the flush to the minimum during the flush, the rate at which pressure falls, the rate at which pressure increases after a flush (during refill), and the total time for the flush cycle (the time difference between the start of flush and the completion of refilling). For example, monitor 101 learns flush parameters for toilet 111 that include the pressure drop parameter 611, the rate of pressure drop (during tank emptying) 613, the rate of pressure increase (during tank refilling) 614, and the flush cycle time 612; similarly monitor 102 learns flush parameters for toilet 112 that include the pressure drop parameter 621, the rate of pressure drop (during tank emptying) 623, the rate of pressure increase (during tank refilling) 624, and the flush cycle time 622. Each parameter may be different for the two different toilets 111 and 112. These specific parameters are illustrative; one or more embodiments may characterize the flush pressure change curve for each toilet using any desired parameters or information.

Flush parameters may remain relatively constant for each toilet; however, they may change slowly over time as toilet components age, for example. In one or more embodiments a toilet monitor may update the flush parameters periodically to account for these slow changes, and it may potentially provide an alert if the parameters change substantially. For example, a slow but measurable decrease in the refill rate (such as parameter 614 for toilet 111) may indicate an emerging problem with the toilet plumbing or the refill valve.

Pressure changes that do not match the identified flush pressure change pattern may indicate a toilet malfunction. In one or more embodiments the analysis server (or the toilet monitor, or a combination of the two) may transmit an alert when it detects these unusual pressure changes. The specific pressure change pattern may also be used to identify the type of malfunction. FIGS. 7, 8, and 9 show illustrative examples of detected malfunctions. In FIG. 7, the filtered pressure data series 701 shows two flushes followed by an abnormal pressure change pattern with a pressure drop 702 that corresponds to a flush, but a subsequent pressure increase 703 that is less than the expected change due to refill (which should match the pressure drop 702). This pattern indicates a leak where the toilet is constantly running with a flapper that is stuck open. The system sends an alert 704 that indicates the malfunction and that identifies the type of leak detected (and the identity of the toilet where the leak is occurring).

In FIG. 8, the system sees a different pattern of pressure change that suggests a different kind of leak. In this scenario the pressure drops slowly to a level where the refill valve turns on, and the toilet then refills to its steady-state level. This occurs repeatedly. This repeated pattern suggests a slow leak. It can be differentiated from the running leak of FIG. 7 because the pressure drop 803 that occurs before refill starts is lower than the expected drop 802 for a full flush, and because the pressure increase rate 804 matches the expected rate when the toilet is refilling. The system sends an alert 805 with the type of leak that is identified (and the identity of the toilet where the leak is occurring).

FIG. 9 shows a different example of detection of a potential malfunction when the total cycle time 903 observed for a flush is considerably longer than the typical value 902 for the specific toilet. This longer cycle time may indicate that refilling is slower than usual, and an alert 904 may indicate the specific malfunction.

The scenarios in FIGS. 7, 8, and 9 are illustrative examples of specific types of problems that may be detected by comparing an observed pattern of pressure changes to the typical flush pressure change cycle for the toilet. Any significant deviation from the flush pattern may indicate a potential malfunction.

In one or more embodiments of the invention, temperature data may also be analyzed and alerts may be generated based on temperature data. For example, freezing pipes can be extremely destructive, so providing property managers with warning of an impending freeze may be very valuable. FIG. 10 shows an example of a temperature data series 1001 obtained from a toilet monitor; when the temperature comes within a threshold 1002 of the freezing point of water (0 degrees Celsius), an alert message 1003 may be generated. In this example the temperature monitored by the toilet monitor decreased steadily towards zero; this suggests a possible problem with the temperature in the room where the toilet is located, such as an open window in winter conditions or failure of a heating system. FIG. 11 shows a different scenario where the temperature 1111 measured by the toilet monitor drops to a low level 1112 during the refill after a flush 1102 detected in pressure data 1101. This pattern suggests that the water in the pipes that is refilling the tank is near freezing, and that the water in the tank gradually rewarms to room temperature after the refill. An alert 1120 may be generated that specifically points to the pipes as a freeze risk in the associated toilet. FIGS. 10 and 11 show that the system may be able to pinpoint the source of a freeze risk (cold room as in FIG. 10 vs. cold pipes as in FIG. 11) in addition to warning that freezing is imminent.

In one or more embodiments of the invention, the system may count the flushes of each toilet and may track trends in the flush counts over time. Flush count information may be useful for many purposes, such as estimating the water consumption of each toilet, checking occupancy of rooms, and determining when scheduled maintenance should be performed. FIG. 12 shows another potential application of flush counts: health alerts. For some medical conditions, such as kidney or bladder issues, increasing frequency of toilet use may suggest an emerging or worsening health problem. In the example shown in FIG. 12, analysis 1202 increments a flush count whenever the pressure data 1201 matches a flush pattern for the toilet, and it generates a trend curve 1203 of the number of flushes per day observed for this toilet. This flush count trend 1203 shows a steady increase, so a health alert 1205 is transmitted when the flush count reaches a threshold level 1204.

In one or more embodiments of the invention, additional health metrics may be calculated from toilet monitor data. For example, in toilets with different flush volumes for different purposes, counts and trends of each type of flush may provide additional information. Vibrations from toilet use may also be detected directly by the pressure sensor in the toilet monitor, and analysis of these vibrations may provide additional insights.

While the invention herein disclosed has been described by means of specific embodiments and applications thereof, numerous modifications and variations could be made thereto by those skilled in the art without departing from the scope of the invention set forth in the claims.

What is claimed is:

1. A toilet monitoring network that detects leaks and flushes, comprising:
   a multiplicity of toilet monitors, wherein
      each toilet monitor of said multiplicity of toilet monitors is configured to be placed under water in a tank of a corresponding toilet; and
      each toilet monitor comprises
         a flexible hermetic housing configured to flex to equalize an internal pressure within said flexible hermetic housing with a pressure of said water in said tank;
         electronics contained within said flexible hermetic housing comprising
            a pressure sensor configured to measure said internal pressure;
            a wireless communications interface; and
            a microprocessor coupled to said pressure sensor and to said wireless communications interface;
         wherein said microprocessor is configured to
            obtain a series of pressure data from said pressure sensor; and transmit said series of pressure data via said wireless communications interface; and,
wherein said microprocessor or an analysis system comprising one or more processors coupled to said multiplicity of toilet monitors via a network connection is configured to
transform said series of pressure data to a filtered series that substantially removes changes in barometric pressure from said series of pressure data;
analyze said filtered series to
identify a flush pressure change pattern of the corresponding toilet in which each toilet monitor is installed; and,
when said filtered series indicates a substantial pressure change that does not match said flush pressure change pattern, transmit a malfunction alert with an identification of the corresponding toilet.

2. The toilet monitoring network that detects leaks and flushes of claim 1, wherein said malfunction alert comprises a type of malfunction.

3. The toilet monitoring network that detects leaks and flushes of claim 2, wherein said type of malfunction comprises
a slow leak malfunction; and
an open flapper malfunction.

4. The toilet monitoring network that detects leaks and flushes of claim 1, wherein said analysis system is further configured to analyze said filtered series to
when said filtered series indicates a pressure change that matches said flush pressure change pattern, increment a flush count of the corresponding toilet; and,
transmit the flush count with the identification of the corresponding toilet.

5. The toilet monitoring network that detects leaks and flushes of claim 1, wherein said transform said series of pressure data to said filtered series comprises apply a high pass filter to said series of pressure data to obtain said filtered series.

6. The toilet monitoring network that detects leaks and flushes of claim 1, wherein said flush pressure change pattern comprises
a flush pressure drop comprising a change in pressure of said filtered series from a filled tank pressure level prior to a flush to a minimum pressure value during said flush;
a flush cycle time comprising a time difference between a start of said flush and a time when said tank completes refilling after said flush; and,
a tank refill rate comprising a rate of pressure change when said tank is refilling after said flush.

7. The toilet monitoring network that detects leaks and flushes of claim 6, wherein
said malfunction alert comprises a type of malfunction;
said type of malfunction comprises a slow leak malfunction; and
said analysis system is further configured to identify said slow leak malfunction when pressure in said filtered series increases repeatedly at a rate substantially equal to said tank refill rate without a preceding pressure reduction substantially equal to said flush pressure drop.

8. The toilet monitoring network that detects leaks and flushes of claim 6, wherein
said malfunction alert comprises a type of malfunction;
said type of malfunction comprises an open flapper malfunction; and
said analysis system is further configured to identify said open flapper malfunction when pressure in said filtered series decreases by a change amount substantially equal to said flush pressure drop and pressure does not subsequently increase by said change amount.

9. The toilet monitoring network that detects leaks and flushes of claim 1, wherein
each toilet monitor further comprises a temperature sensor;
said microprocessor is further configured to
obtain a series of temperature data from said temperature sensor; and
transmit said series of temperature data via said wireless communications interface; and,
said analysis system is further configured to
receive said series of temperature data from each toilet monitor;
analyze said series of temperature data to
when said series of temperature data contains a temperature below a threshold value, transmit a water freeze warning alert with the identification of the corresponding toilet.

10. The toilet monitoring network that detects leaks and flushes of claim 9, wherein said analysis system is further configured to
modify said series of pressure data based on said series of temperature data to remove an effect of temperature on said changes in barometric pressure.

11. The toilet monitoring network that detects leaks and flushes of claim 1, wherein
said wireless communications interface comprises a Bluetooth Low Energy communications interface; and,
said microprocessor is further configured to transmit said series of pressure data via said Bluetooth Low Energy communications interface to a gateway near each toilet monitor; and,
said gateway is configured to forward said series of pressure data to said analysis system.

12. The toilet monitoring network that detects leaks and flushes of claim 1, wherein
each toilet monitor is configured to be placed under water in said tank of said corresponding toilet in any position and in any orientation without affecting functionality of the electronics.

13. The toilet monitoring network that detects leaks and flushes of claim 1, wherein
each toilet monitor further comprises a battery level monitor; and,
one or both of said microprocessor and said analysis system is further configured to
transmit a low battery alert when a battery level measured by said battery level monitor falls below a battery level threshold value.

14. The toilet monitoring network that detects leaks and flushes of claim 1, wherein
each toilet monitor has a shape of a disc.

15. The toilet monitoring network that detects leaks and flushes of claim 14, wherein
a diameter of said disc is substantially equal to 46 millimeters; and,
a height of said disc is substantially equal to 20 millimeters.

* * * * *